United States Patent
Jørgensen et al.

(10) Patent No.: US 12,162,572 B2
(45) Date of Patent: Dec. 10, 2024

(54) APPARATUS FOR CLEANING OR MAINTAINING THE OUTER SIDE OF A HULL OR THE INNER SIDE OF A CARGO HOLD OF A MARINE VESSEL WITH IMPROVED ATTACHMENT CAPACITY

(71) Applicant: CLIIN APS, Søborg (DK)

(72) Inventors: Thomas Jørgensen, Allerød (DK); Bo Møller Hansen, Gentofte (DK); Nikolaj Hans Bramsen Kloster, Bagsværd (DK); Rasmus Valdemar Bresling Haase, København NV (DK)

(73) Assignee: CLIIN APS, Søborg (DK)

( * ) Notice: Subject to any disclaimer, the term of this patent is extended or adjusted under 35 U.S.C. 154(b) by 585 days.

(21) Appl. No.: 17/599,624

(22) PCT Filed: Mar. 19, 2020

(86) PCT No.: PCT/DK2020/050072
§ 371 (c)(1),
(2) Date: Sep. 29, 2021

(87) PCT Pub. No.: WO2020/200377
PCT Pub. Date: Oct. 8, 2020

(65) Prior Publication Data
US 2022/0194531 A1     Jun. 23, 2022

(30) Foreign Application Priority Data
Apr. 1, 2019   (DK) .............................. PA201970199

(51) Int. Cl.
*B63B 59/10*     (2006.01)
*B60G 7/00*      (2006.01)
(Continued)

(52) U.S. Cl.
CPC .............. *B63B 59/10* (2013.01); *B60G 7/001* (2013.01); *B62D 55/02* (2013.01); *B62D 55/265* (2013.01)

(58) Field of Classification Search
CPC ...................................................... B62D 55/265
See application file for complete search history.

(56) References Cited

U.S. PATENT DOCUMENTS 3,088,429 A * 5/1963 Johannessen ........... B63B 59/10
                                                        15/52.1
9,738,335 B2 * 8/2017 Davies .................. B62D 57/024
(Continued)

FOREIGN PATENT DOCUMENTS

CN         108791555 A       11/2018
JP         S6069785 U         5/1985
WO    WO-2018036597 A1 *     3/2018    ............. B08B 1/002

OTHER PUBLICATIONS

International Search Report, Application No. PCT/DK2020/050072, Mailed Apr. 30, 2020, 2 pages.

*Primary Examiner* — Tony H Winner
*Assistant Examiner* — Hosam Shabara
(74) *Attorney, Agent, or Firm* — Ziegler IP Law Group LLC.

(57) ABSTRACT

An apparatus for cleaning or maintaining the outer side of a hull of a marine vessel or the inner side of a cargo hold of a marine vessel. The apparatus includes a housing provided with a first row of magnetic driving and attachment elements and a second row of magnetic driving and attachment elements. The first and second row being parallel and arranged at opposing lateral sides of the housing. The first row of magnetic driving and attachment elements comprising magnetic wheels and/or a continuous track with magnetic links. The second row of magnetic driving and attachment elements comprising magnetic wheels and/or a
(Continued)

continuous track with magnetic links. Further, the apparatus is provided with least one suspended magnetic wheel arranged between the first row and the second row, the at least one suspended magnetic wheel being resiliently suspended from the housing and biased towards the housing.

9 Claims, 7 Drawing Sheets

(51) Int. Cl.
    *B62D 55/02*     (2006.01)
    *B62D 55/265*     (2006.01)

(56) References Cited

U.S. PATENT DOCUMENTS

| | | | |
|---|---|---|---|
| 10,829,171 B2* | 11/2020 | Parrott | B62D 57/024 |
| 10,981,635 B2* | 4/2021 | Jørgensen | B62D 55/0847 |
| 11,906,342 B2* | 2/2024 | Chen | B62D 57/024 |
| 2014/0339004 A1 | 11/2014 | Beard et al. | |
| 2022/0402115 A1* | 12/2022 | Stoyanov | B25J 5/005 |

\* cited by examiner

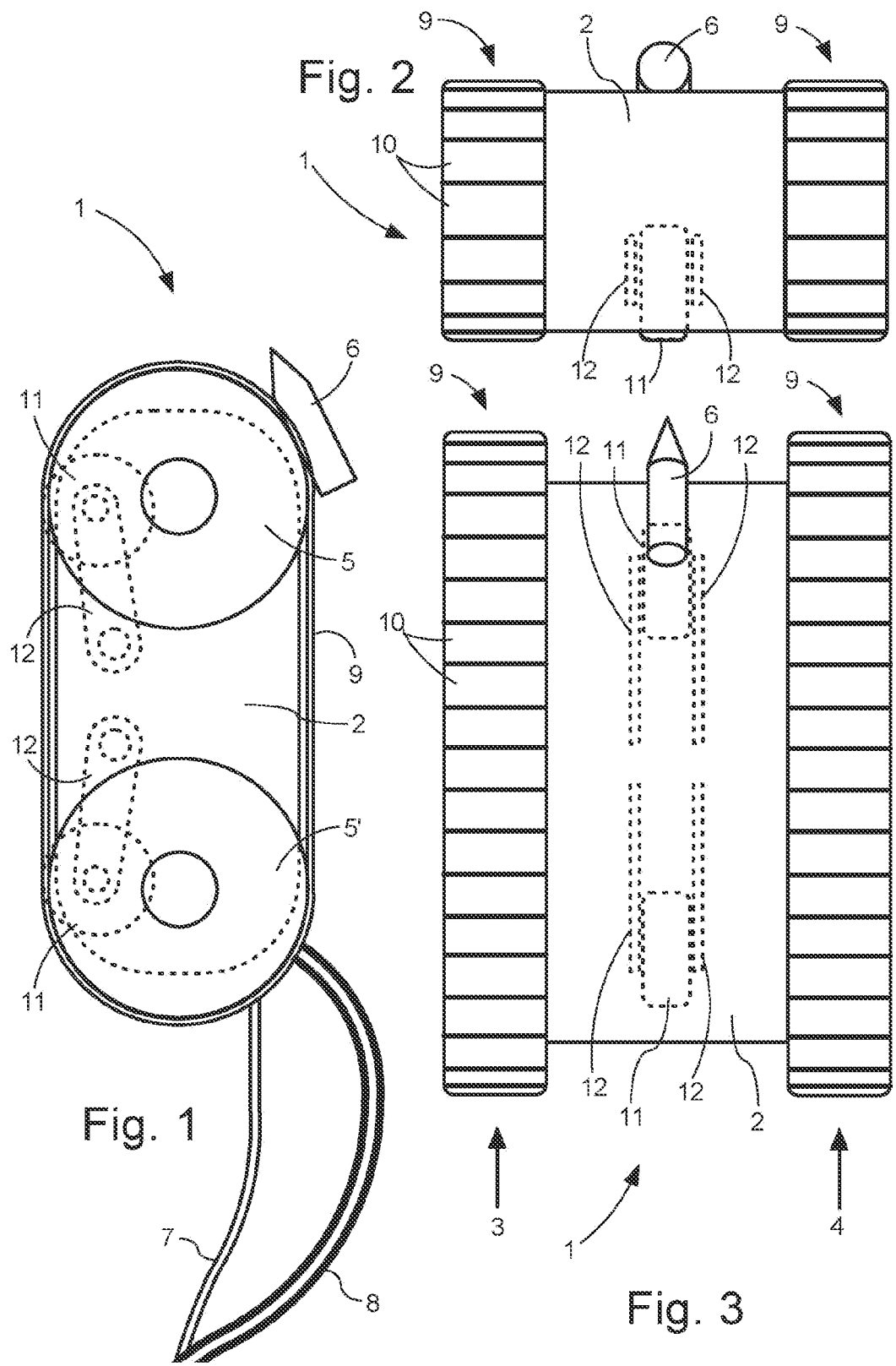

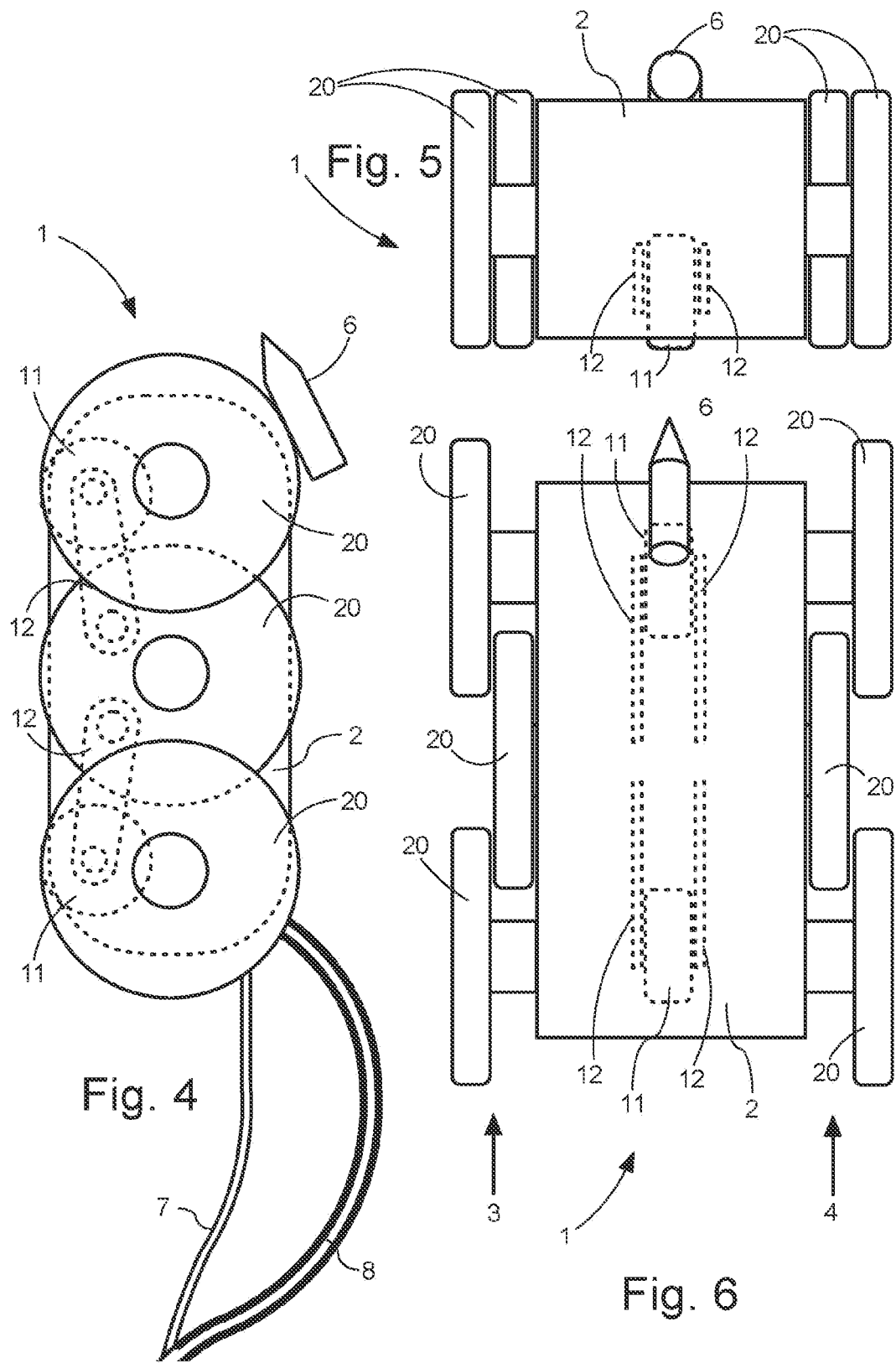

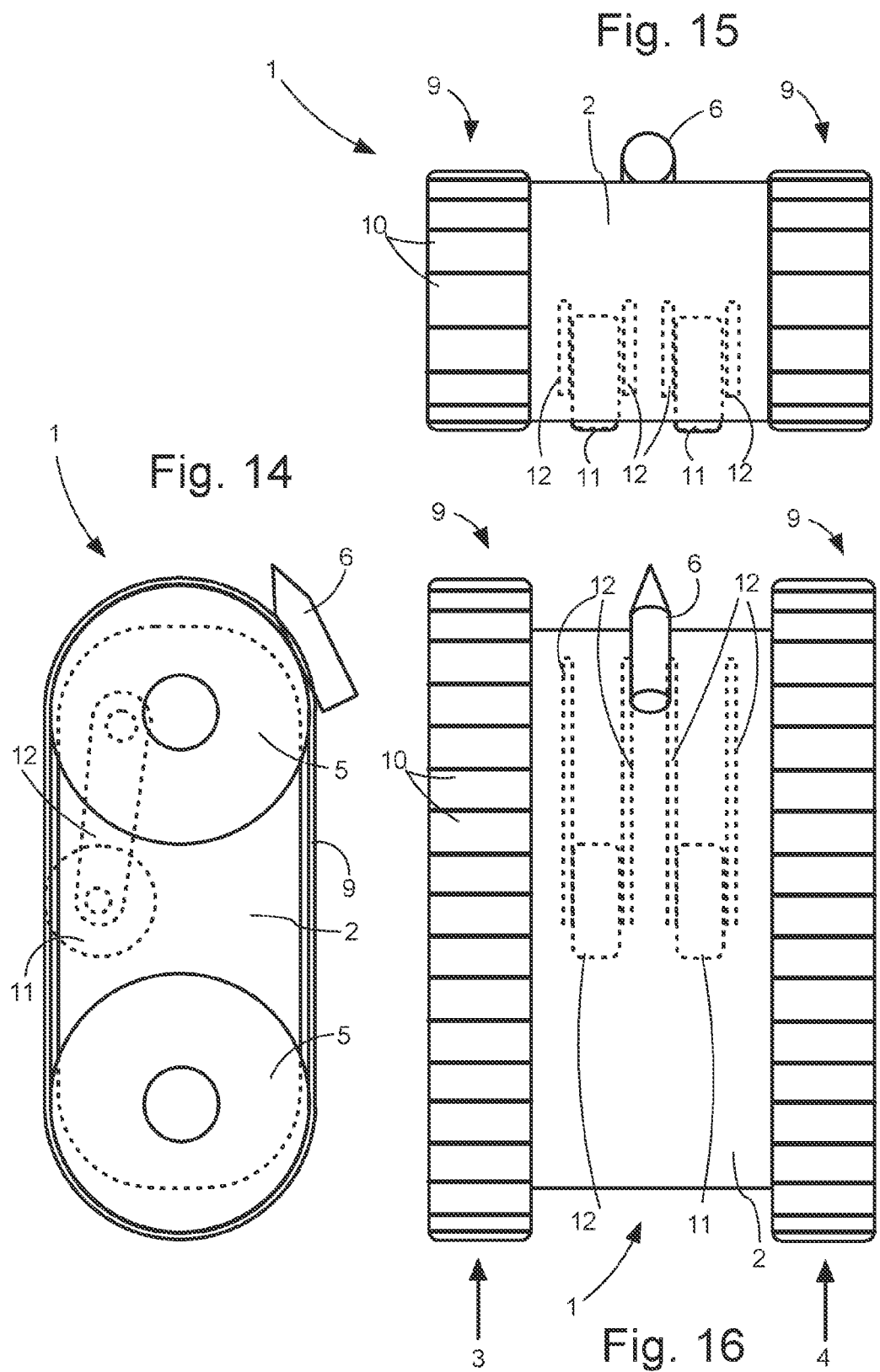

ial runner, four powered wheels having a periphery which bears directly on the climbing surface. The resilient runners are provided with rollers to reduce friction between the resilient runners and the climbing surface.

APPARATUS FOR CLEANING OR MAINTAINING THE OUTER SIDE OF A HULL OR THE INNER SIDE OF A CARGO HOLD OF A MARINE VESSEL WITH IMPROVED ATTACHMENT CAPACITY

TECHNICAL FIELD

The disclosure relates to a cleaning and/or maintenance apparatus, in particular to a hull or cargo space cleaning apparatus that is attached to the outer side of a marine vessel or the inner side of a cargo hold of a marine vessel by magnetic driving and attachment elements, for e.g. removing deposits, organic and inorganic, from both submerged and unsubmerged surfaces of the hull of a marine vessel as well as a wall of the bulkheads cargo hold in the hull of a marine vessel.

BACKGROUND

WO2018036597 discloses an apparatus for cleaning the outer side of the hull of a marine vessel and for cleaning the bulkhead of cargo holds according to the preamble of claim 1. The apparatus comprises a housing provided with magnetic continuous tracks at opposing lateral sides of the housing, a front wheel and a rear wheel for each of the magnetic continuous tracks, each magnetic continuous track comprising a plurality of links interconnected by drive pins, a guide configured to engage the drive pins for preventing the links in a first portion of the extent of the magnetic continuous tracks between the front wheel and the rear wheel from moving away from the housing. Thus, the portion of the magnetic tracks that extends between the front wheel and the rear wheel on the side of the apparatus that faces the hull or cargo hold cannot is not suspended relative to the housing and cannot move relative to the housing.

Therefore, it is practically impossible for the magnetic links to be detached (peeled) from the ferromagnetic sides hull or cargo space "one by one" due to flexing of the continuous track (flexing relative to the straight line between the front and rear wheel assumed by the portion of the continuous tracks when no force is applied to the portion of the continuous track concerned). The guide ensures that the links that are in contact with the hull behave as if they were secured to a rigid body and arranged in a straight line. Accordingly, the apparatus can only be disengaged from a planar side of the hull or cargo hold by all magnetic links losing contact simultaneously as opposed to the links of the continuous track being "peeled off one link at a time". This effect of the links acting as one rigid body of links significantly increases the force or load at which a magnetic continuous track disengages form the hull or cargo hold.

However, the lack of suspension, i.e. a lack of the possibility of the continuous track to adapt to uneven, curved or angled surfaces causes relatively weak attachment force to the hull or cargo hold when the apparatus passes uneven, curved or angled surfaces. This reduced attachment force is particularly problematic in transitions from a vertical bulkhead to an overhead bulkhead, i.e. a bulkhead that is at least partially facing downwards.

US2014339004 discloses a climbing vehicle for traversing a climbing surface that can accommodate variations and geometry of the climbing surface while efficiently transferring forces while providing a large payload to weight capacity comprising a chassis two resilient runners attached to the chassis and in sliding contact with the climbing surface, a permanent magnet rigidly attached to each resil-

SUMMARY

It is an object to provide an apparatus that overcomes or at least reduces the problem mentioned above.

The foregoing and other objects are achieved by the features of the independent claims. Further implementation forms are apparent from the dependent claims, the description, and the figures.

According to a first aspect, there is provided an apparatus for cleaning or maintaining the outer side of a hull or the inner side of a cargo hold of a marine vessel, the apparatus comprising:

a housing provided with a first row of magnetic driving and attachment elements and a second row of magnetic driving and attachment elements, the first and second row being parallel and arranged at opposing lateral sides of the housing, the first row of magnetic driving and attachment elements comprising magnetic wheels and/or a continuous track with magnetic links, the second row of magnetic driving and attachment elements comprising magnetic wheels and/or a continuous track with magnetic links, at least one suspended magnetic wheel at least partially arranged between the first row and the second row, the at least one suspended magnetic wheel being suspended from the housing and biased towards the housing.

By providing a resiliently suspended magnetic wheel the magnetic attachment force by the non-resilient rows of magnetic driving and attachment elements is enhanced by a magnetic attachment force that can better cope with surface irregularities and sharp transitions, in which the stiff rows of magnetic driving and attaching elements do not provide their maximum attachment force.

In a possible implementation form of the first aspect, the magnetic driving and attachment means of the first row and the second row are rigidly connected to the housing.

In a possible implementation form of the first aspect, the at least one suspended magnetic wheel is arranged on a first side of the housing that is intended for facing the outer side of the vessel or the inner side of the cargo space.

In a possible implementation for the first aspect the at least one suspended magnetic wheel protrudes from the side of the apparatus facing the outer side of the inner side, when the at least one suspended magnetic wheel is in an extended position.

In a possible implementation form of the first aspect, the at least one suspended magnetic wheel is suspended in a way that allows the suspended magnetic wheel to move to and from the first side with the suspended magnetic wheel being biased towards the housing.

In a possible implementation form of the first aspect, the at least one suspended magnetic wheel is biased towards the housing by a resilient force.

In a possible implementation form of the first aspect, the suspended magnetic wheel is suspended to allow the suspended magnetic wheel to move between a fully retracted position P1 closest to the housing and a fully extended position P5 furthest away from the housing.

In a possible implementation form of the first aspect, the magnitude of the resilient force at or near the fully retracted P1 position has a level R1 which is more than zero, the resilient force increases to a level R2 which is higher than the level R1 when the suspended magnetic wheel moves from the fully retracted position P1 to an intermediate P2 position between the fully retracted position and the fully extended position P5, and wherein the resilient force decreases when the resilient magnetic wheel moves from the medial position P2 to the fully extended position P5.

By increasing the resilient force on the magnetic resilient wheel when it moves toward an intermediate position P2, and vice versa and by reducing the resilient force on the magnetic resilient wheel when it moves from the intermediate position towards its fully extended position and vice versa it is ensured that spend magnetic wheel does not lose contact with the inner side of the cargo space or outer side of the hull due to the maximum contact force that the magnetic wheel can provide being exceeded, which is more likely to occur in a suspension in which the resilient attractive force steadily increases from the fully retracted position to the fully extended position.

Further, the inventors have arrived at the unexpected insight that the attractive force should be highest at a position between the fully retracted position and the fully extended position due to the angle between the suspension arm and the outer side of the hull or the inner side of the cargo space.

In a possible implementation form of the first aspect, the magnitude of the resilient force at or near the fully extended position P5 has a level R3 which is higher than zero, and preferably substantially equal to level R1.

In a possible implementation form of the first aspect, the apparatus comprises a resilient member operably connected to the suspended magnetic wheel to provide a resilient force on the suspended magnetic wheel.

In a possible implementation form of the first aspect, the resilient member is operably connected to the suspended magnetic wheel via a mechanism comprising a suspension arm.

In a possible implementation form of the first aspect, the apparatus comprises two suspended magnetic wheels.

In a possible implementation form of the first aspect, the apparatus comprises a suspended magnetic wheel arranged at or near a forward end of the housing and another suspended magnetic wheel arranged at or near the rearward end of the housing.

In a possible implementation form of the first aspect, the apparatus comprises a rotating or linear actuator operably connected to the suspension arm.

In a possible implementation form of the first aspect, the magnetic wheel is connected to a free end of the suspension arm.

In a possible implementation form of the first aspect, the suspension arm is pivotally connected at one end to the housing.

These and other aspects will be apparent from and the embodiment(s) described below.

BRIEF DESCRIPTION OF THE DRAWINGS

In the following detailed portion of the present disclosure, the aspects, embodiments, and implementations will be explained in more detail with reference to the example embodiments shown in the drawings, in which:

FIGS. 1 to 3 are side, rear, and top views, respectively of an apparatus according to a first embodiment, FIGS. 4 to 6 are side, rear, and top views, respectively of an apparatus according to a second embodiment, FIGS. 14 to 16 are side, rear, and top views, respectively of an apparatus according to a third embodiment.

DETAILED DESCRIPTION

Figure 7:
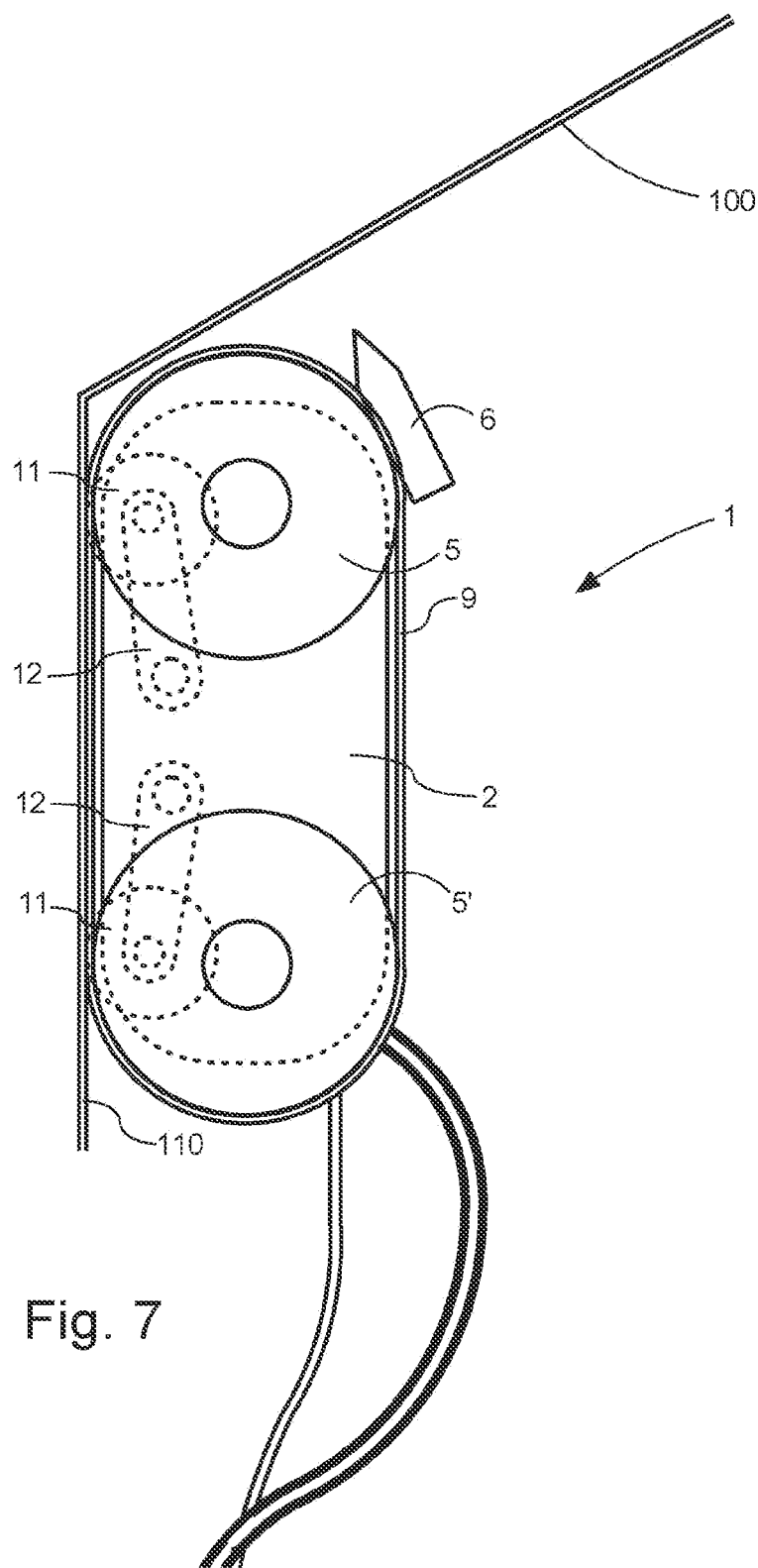
FIG. 7 is a diagrammatic representation of the apparatus according to the first embodiment attached to a planar bulkhead.

FIGS. 1 to 3 show a preferably submersible apparatus 1 for cleaning or maintaining the outer side of the hull or the inner side of a cargo space in a marine vessel (merchant ship).

The apparatus 1 comprises a watertight housing 2 provided with magnetic continuous tracks 9 at opposing lateral sides of the watertight housing 2. Each magnetic continuous track 9 forms a straight row 3,4 of magnetic attachment and driving elements, with one row 3,4 for being arranged at either side of the housing 2.

The magnetic endless tracks 9 extend between a front wheel 5 and a rear wheel 5', with at least one of the front or rear wheel being a drive wheel coupled to a drive motor (not shown). The drive wheel is in an embodiment in the form of the sprocket. In an embodiment, the apparatus 1 is provided with road wheels (not shown) for supporting the weight of the apparatus or with a guide (not shown) for guiding the continuous track 9 in a straight line between the front wheel 5 and rear wheel 5'. This guide is in an embodiment configured to provide support to the links 10 in a direction both away and towards the housing 2 so that at least a portion of the extent of the continuous magnetic track 9 between the front wheel 5 and the rear wheel 5' is essentially stiff and can only follow a rectilinear path. The magnetic tracks are built from modular chain links 10 joined by a hinge, with each link 10 or each second link 10 being provided with a permanent magnet.

At least one drive motor (not shown) provided inside the watertight housing 2 and is operably connected to at least one magnetic continuous track 9 for driving the magnetic continuous track 9. The watertight housing 2 is provided with a main side between the magnetic continuous tracks 9. The main side facing away from the hull or the wall of the cargo space during a cleaning maintenance operation. The main side is provided with a versatile mounting plate for detachably attaching a cleaning tool 6, e.g. by a magnetic or quick coupling(s) (not shown). The cleaning tool 6 can be one of a variety of types. On type of cleaning tool, 6 comprises high-pressure cleaning nozzles and inlet for connecting to a high-pressure water hose (not shown). The cleaning tool 6 may in an embodiment (not shown) comprise rotating brushes and a drive powered by high-pressure water received via the high-pressure hose or by electric drive motors.

The two magnetic continuous tracks 9 are provided with a plurality of permanent magnets substantially equally distributed along the length the continuous tracks 9 for allowing the continuous tracks 9 to magnetically adhere to the outer side of the hull or inner side of the cargo space of the marine vessel.

In an embodiment, the housing 2 comprises two electric drive motors (not shown). One electric drive motor is operably connected to the drive wheel 5,5' of one of the magnetic continuous tracks 9 and the other electric drive motor being operably connected to the drive wheel 5,5' of the other magnetic continuous track 9.

The housing 2 is connected to a power cable 7 and a water hose 8, for supplying the apparatus 1 with water for the cleaning apparatus 6 and with power for the electric drive motor and other electric or electronic components in the apparatus 1. In an embodiment, the apparatus 1 comprises an electronic control unit is configured to allow the apparatus to operate autonomously or semi-autonomously. In another embodiment, the apparatus is controlled from a remote control unit, either wireless or via signals that are transmitted by a power cable 7 or a signal cable that is integral with the power cable 7. In an embodiment, the apparatus 1 is also hooked up to a suspension wire (not shown) for safety reasons.

The continuous tracks 9 with their links 10 are substantially unsuspended, i.e. stiff, which, as mentioned before provides for a very large attachment fourth to substantially planar surfaces, but such a stiff non-suspended construction is less ideal for coping with bumps, ridges, curved surfaces and transitions between angled planar surfaces. Unavoidably, cargo holds have of such bumps, ridges, curved surfaces and transitions between angled planar surfaces. In order to ensure proper magnetic attachment of the apparatus to the inner side of the cargo space in such circumstances, at least one suspended magnetic wheel 11 is provided on the side of the housing 2 (the bottom side) that faces the surface of the cargo space or the hull.

In the present embodiment, the apparatus 1 is provided with two magnetic wheels 11 on the side of the housing 2 that is facing the inner side of the cargo space, with one suspended magnetic wheel 11 at the front and one suspended magnetic wheel 11 at the rear of the apparatus 1. Each suspended magnetic wheel 11 is suspended from the housing 2 by a suspension arm 12 that allows the suspended magnetic wheel to travel between a fully retracted position in which a portion of the suspended magnetic wheels 11 facing side of the cargo space is flush with the surface of the continuous tracks 9 that face the side of the cargo space. The suspension mechanism allows the suspended magnetic wheel 11 to move from the fully retracted position to a fully extended position in which the suspended magnetic wheel 11 protrudes substantially beyond the continuous tracks 9 in the direction towards the inner side of the cargo space. In the present embodiment, the apparatus 1 is provided with two suspended magnetic wheels 11, with each its own suspension arm 12.

The suspension arm is connected to a mechanism and/or actuator that is configured to apply a resilient retracted force to the suspended magnetic wheel 11. This mechanism may comprise springs, links, dampers and/or an actuator. The actuator can be an electric actuator (rotating or linear), a hydraulic actuator (rotating or linear) or a pneumatic actuator (rotating or linear). The mechanism may be provided with resilient means, such as e.g. a spring. The spring may be a linear spring or a rotational spring, the spring may be a wire spring or a leaf spring, a torsion spring or a spiral spring, a pneumatic spring and/or an elastomeric element. The two suspended magnetic wheels 11 are suspended independent from one another. In an embodiment (not shown) the two magnetic wheels 11 are suspended in a dependent fashion.

FIGS. 4 to 6 show another embodiment in which the rows of magnetic driving and attachment elements 3, 4 are formed by a row of magnetic wheels 20. In this embodiment, structures and features that are the same or similar to corresponding structures and features previously described or shown herein are denoted by the same reference numeral as previously used for simplicity. This embodiment is similar to the embodiment of FIGS. 1 to 3 except for the unsuspended continuous magnetic tracks being replaced by unsuspended magnetic wheels 20. In the shown embodiment the apparatus 1 has six unsuspended magnetic wheels 20. However, it is understood that the apparatus could have four suspended wheels 20 or more than six unsuspended magnetic wheels 20. It is also understood that the front wheels 20 can be replaced by one wide roller, essentially extending the full width of the apparatus (not shown) and that the rear wheels 20 can be replaced by one wide roller), substantially extending the full width of the apparatus.

In the present embodiment at least two of the unsuspended magnetic wheels 20 are driven wheels. Preferably, more than two of the magnetic wheels 20 are driven wheels. In an embodiment, all of the magnetic wheels 20 are driven wheels.

Figure 8:
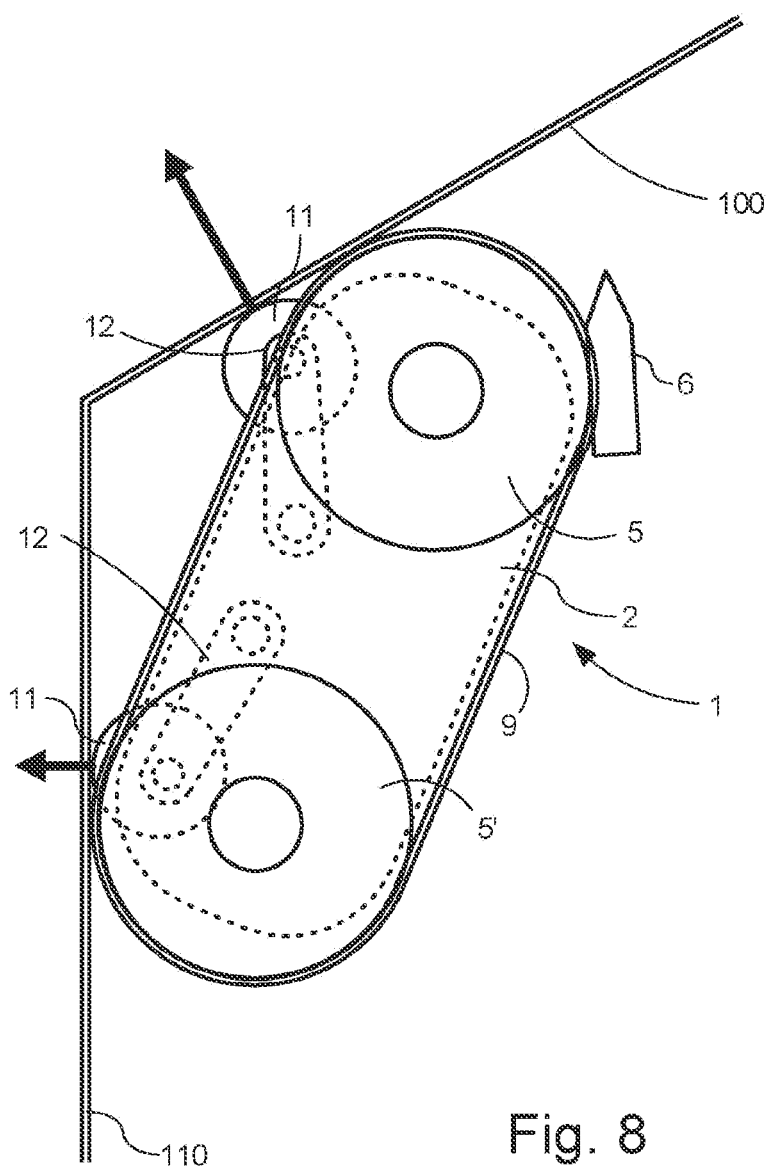
FIGS. 8 and 9 are diagrammatic representations of the apparatus according to the first embodiment located at different positions in a transition between a vertical bulkhead and a partially downwardly facing bulkhead.
Figure 9:
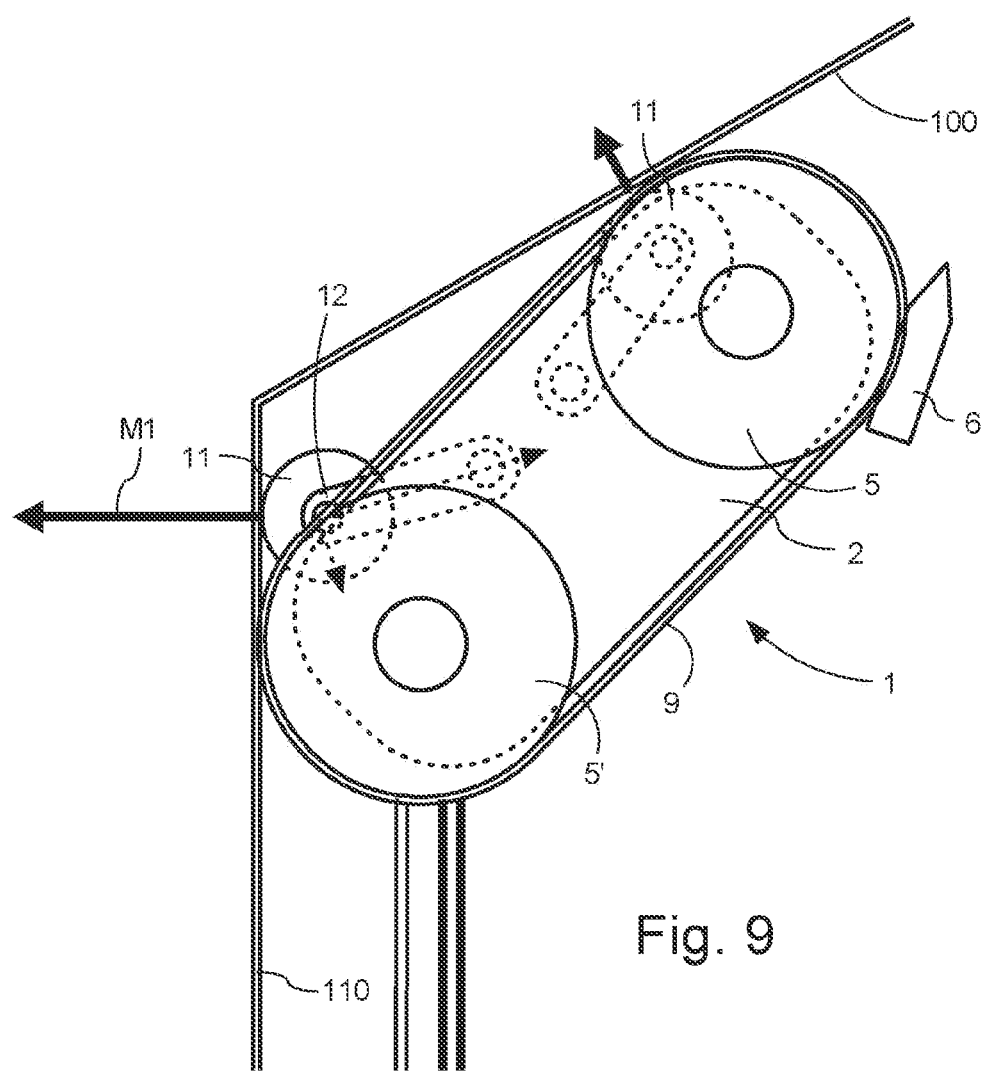

FIGS. 7 to 9 illustrate an example of the operation of the apparatus, and in particular the operation of the suspended magnetic wheels 11 when the apparatus has to cope with surface irregularities. In the present example, the surface irregularity is a sharp transition between two planar sides of the cargo space. The planar side on the left side of FIGS. 7 and 8, is a vertical bulkhead that meets another bulkhead that is inclined in such a way that it is partly facing downwards. The transition between the two bulkheads 100,110 is a sharp transition in this example, but the operation of the suspended magnetic wheels 11 would be substantially the same if the transition between the bulkheads 100, 110 was a rounded transition.

FIG. 7 shows the situation where the apparatus has climbed up along the vertical bulkhead 110 towards the transition and the forward part of the tracks 9 is about to engage the inclined bulkhead 100.

FIG. 8 shows the situation where the apparatus is an initial stage of passing the transition with a forward portion of the tracks 9 engaging the inclined bulkhead 100 and the rearward portion of the continuous magnetic tracks 9 engaging the vertical bulkhead 110. Typically, in this type of situation, only a single magnetic link 10 engages the inclined bulkhead 100 and another single magnetic link 10 engages the vertical bulkhead 110. Thus, only very few magnetic links 10 ensure that the apparatus 1 is attached to the bulkheads 100, 110.

The attachment to the bulkheads 100, 110 in such situations is improved by the suspended magnetic wheels 11, which provide additional magnetic attachment force to the ferromagnetic bulkheads 100, 110. The additional magnetic attachment force supplied by the suspended magnetic wheels is illustrated by the arrows M1.

When the apparatus 1 is an initial phase of passing the transition shown in FIG. 8 the magnetic attachment force M1 and of the forwardly mounted suspended magnetic wheel 11 pulls the suspended magnetic wheel 11 away from the housing 2 against the resilient force of the suspension mechanism.

In the shown stage of passing the transition also the rearwardly mounted suspended magnetic wheel 11 is slightly pulled away from the housing 2 to by the magnetic force between the suspended magnetic wheel 11 and the vertical bulkhead 110.

Both the front suspended magnetic wheel 11 and the rear suspended magnetic wheel 11 contribute to the attachment force that prevents the apparatus 1 from disengaging the bulkheads 100, 110.

The next stage of passing the transition is shown in FIG. 9. The front suspended magnetic wheel 11 is now almost completely retracted again and the rear suspended magnetic wheel 11 has moved further away from the housing 2 towards the fully retracted position.

Both the front suspended magnetic wheel 11 and the rear suspended magnetic wheel 11 contribute to the attachment force that prevents the apparatus 1 from disengaging the bulkheads 100, 110.

Figure 10:
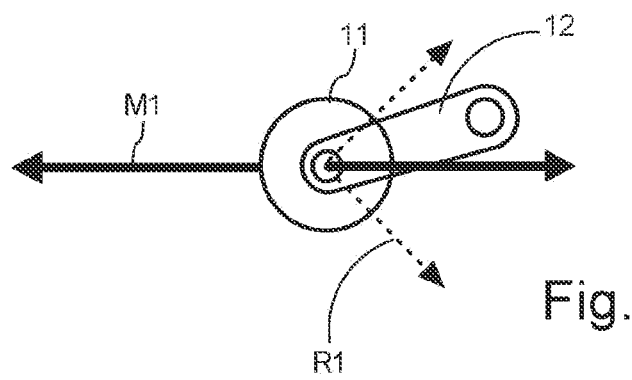
FIG. 10 is a detail of FIGS. 8 and 9 illustrating magnetic and resilient forces acting on a suspended magnetic wheel of the apparatus.

FIG. 10 illustrates the forces acting on the rear suspended magnetic wheel 11 in the situation of the example of FIG. 9. The suspension mechanism exerts a retractive force perpendicular to the side of the apparatus 1 facing the bulkheads with a size R1 to the suspended magnetic wheel 11. The magnetic force M1 between the vertical bulkhead 110 and the suspended magnetic wheel can only be perpendicular to the bulkhead 100,110 and is equal to the horizontal component of the force vector (horizontal as in FIGS. 9 and 10). Thus, the resulting retractive force of the suspended magnetic wheel 11 away from the bulkhead 100,110 is a function of the angle between the suspension apparatus 1 and the bulkhead 100,110, and the resulting reactive force to the magnetic force M1 can be substantially larger than the retractive force in the retractive direction R1, depending on the angle between the apparatus and the bulkhead 100, 110 to which the suspended magnetic wheel 11 is attached.

With this insight, the inventors realized that the retractive force created by the suspension mechanism in a direction perpendicular to the side of the apparatus 1 facing the bulkhead 100, 110 should not increase steadily when the suspended magnetic wheel 11 is pulled further and further towards the fully extended position, but instead that the retractive force in the direction perpendicular to the side of the apparatus one facing the bulkhead 100, 110 should decrease after having reached a maximum at an intermediate position between the fully retracted position and the fully extended position. In an embodiment, the intermediate position is roughly located at a quarter or a third on the way from the fully retracted position P1 to the fully extended position P2.

Figure 11:
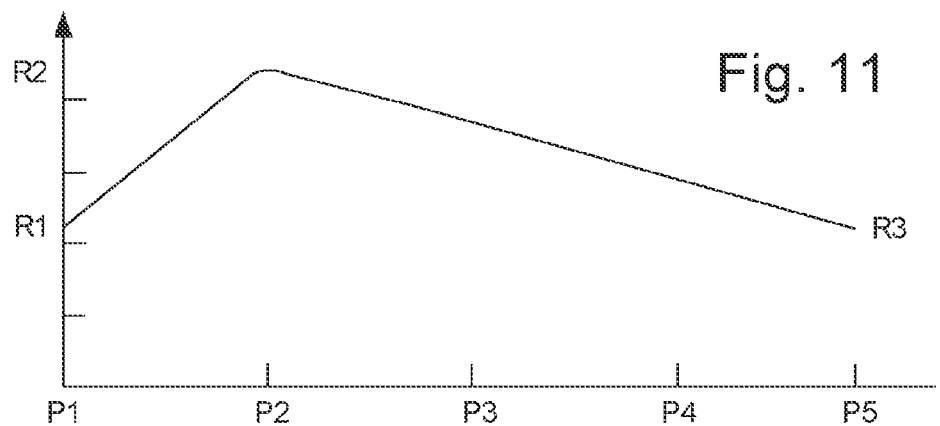
FIGS. 11 to 13 are graphs illustrating the relation between the resilient retracting force acting on the suspended magnetic wheel in relation to the distance of the suspended magnetic wheel to the apparatus.

FIG. 11 is a graph showing a curve of the relation between the retractive force and the position of the suspended magnetic wheel 11. The retractive force is in the direction perpendicular to the side of the apparatus 1 facing the inner side of the cargo space or the outer side of the hull.

P1 is the fully retracted position and P5 is the fully extended position of the suspended magnetic wheel 11 with positions P2, P3, and P4 therebetween. The retractive force has a level R1 as soon as the suspended magnetic wheel 11 is moved away from its fully retracted position. The level R1 is higher than zero. The retractive force steadily increases from the level R1 to a level R2 when the suspended magnetic wheel 11 is moved further away from its fully retracted position P1 to an intermediate position P2. The situation is reversed when the suspended medic wheel 11 moves from the intermediate position P2 to the retracted position P1. Level R2 is the maximum retractive force that the suspension mechanism can apply to the suspended magnetic wheel 11.

The retractive force decreases when the suspended magnetic wheel 11 moves from the intermediate position P2 through the positions P3 and P4 to the fully extended position P5. At position P5 the retractive force has a level R3, which in this example is substantially equal to the retractive force level R1. The situation is reversed when the suspended magnetic wheel 11 moves in towards the intermediate position P2 coming from more extended positions.

Figure 12:
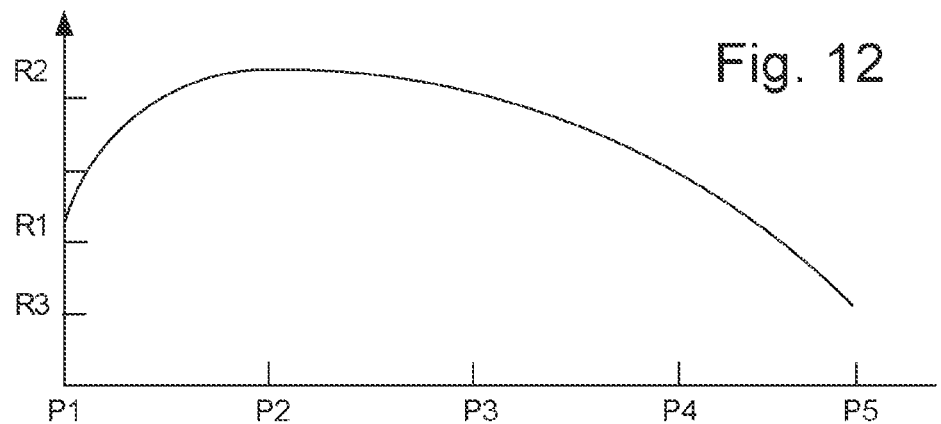
Figure 13:
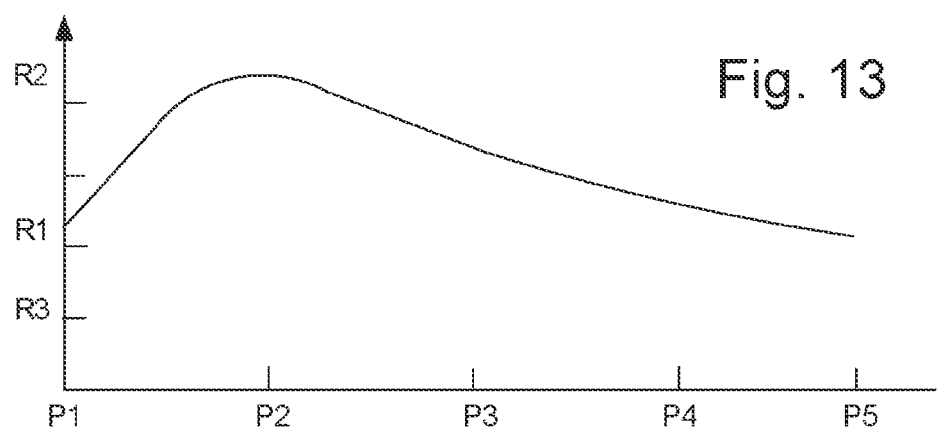

In the example of FIG. 11 relation between the position of the suspended magnetic wheel 11 and the retractive force is almost proportional, but this is not required, as shown by the examples in FIGS. 12 and 13. In the example of FIG. 12, the attractive force has a level R3 at the fully extended position P5 that is lower than the retractive force level R1 at the fully retracted position P1.

FIGS. 14 to 16, show a third embodiment of the apparatus, comprising two suspended magnetic wheels 11 beside one another. In this embodiment, structures and features that are the same or similar to corresponding structures and features previously described or shown herein are denoted by the same reference numeral as previously used for simplicity.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality.

The reference signs used in the claims shall not be construed as limiting the scope.

The invention claimed is:

1. An apparatus for cleaning or maintaining the outer side of a hull or the inner side of a cargo hold of a marine vessel, said apparatus comprising:
   a housing provided with;
      a first row of magnetic driving and attachment elements, said first row of magnetic driving and attachment elements comprising a first driven continuous track with magnetic links, and
      a second row of magnetic driving and attachment elements, said second row of magnetic driving and attachment elements comprising a second driven continuous track with magnetic links,
      said first driven continuous track being configured for providing a first magnetic adherence to the outer side of the hull or the inner side of the cargo hold of the marine vessel,
      said second driven continuous track being configured for providing a second magnetic adherence to the outer side of the hull or the inner side of the cargo hold of the marine vessel,
      said first and second row being parallel and arranged at opposing lateral sides of said housing,
      at least one suspended magnetic wheel at least partially arranged between said first row and said second row, said at least one suspended magnetic wheel being suspended from said housing and biased towards said housing and configured to provide a third magnetic adherence to the outer side of the hull or the inner side of the cargo hold of the marine vessel, in addition to the first magnetic adherence and the second magnetic adherence, at a position between the first driven continuous track and the second driven continuous track.

2. The apparatus according to claim 1, wherein said magnetic driving and attachment means of said first row and said second row are rigidly connected to said housing.

3. The apparatus according to claim 1, wherein said at least one suspended magnetic wheel is arranged on a first side of the housing that is intended for facing the outer side of the hull or the inner side of the cargo hold of the marine vessel.

4. The apparatus according to claim 1, wherein said at least one suspended magnetic wheel is suspended in a way that allows said suspended magnetic wheel to move to and from the outer side of the hull or the inner side of the cargo hold of the marine vessel with said suspended magnetic wheel being biased towards the housing.

5. The apparatus according to claim 1, wherein said at least one suspended magnetic wheel is biased or urged towards the housing by a resilient force.

6. The apparatus according to claim 4, wherein said at least one suspended magnetic wheel is suspended to allow the suspended magnetic wheel to move between a fully retracted position P1 closest to said housing and a fully extended position P5 furthest away from said housing.

7. The apparatus according to claim 1, further comprising a resilient member operably connected to said suspended magnetic wheel to provide a resilient force on said suspended magnetic wheel.

8. The apparatus according to claim 7, wherein said resilient member is operably connected to said suspended magnetic wheel via a mechanism comprising a suspension arm.

9. The apparatus according to claim 1, wherein the at least one suspended magnetic wheel comprises two suspended magnetic wheels that are suspended from the housing independently of each other.

* * * * *